(12) United States Patent
Tokuda

(10) Patent No.: US 8,649,030 B2  
(45) Date of Patent: Feb. 11, 2014

(54) CONTROLLING AN INFORMATION PROCESSING APPARATUS ON WHICH A PLURALITY OF PRINTER DRIVERS ARE INSTALLED

(75) Inventor: Akihiko Tokuda, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 139 days.

(21) Appl. No.: 13/071,457

(22) Filed: Mar. 24, 2011

(65) Prior Publication Data

US 2011/0255115 A1 Oct. 20, 2011

(30) Foreign Application Priority Data

Apr. 19, 2010 (JP) ................................. 2010-096373

(51) Int. Cl.  
*G06F 3/12* (2006.01)

(52) U.S. Cl.  
USPC ......................................................... 358/1.13

(58) Field of Classification Search  
None  
See application file for complete search history.

(56) References Cited

U.S. PATENT DOCUMENTS

| | | | |
|---|---|---|---|
| 7,102,783 B2 * | 9/2006 | Morooka et al. | 358/1.15 |
| 2003/0030837 A1 * | 2/2003 | Simpson et al. | 358/1.15 |
| 2003/0079063 A1 * | 4/2003 | Iida et al. | 710/8 |

FOREIGN PATENT DOCUMENTS

JP 2004126940 A 4/2004

* cited by examiner

*Primary Examiner* — Jeremiah Bryar  
(74) *Attorney, Agent, or Firm* — Fitzpatrick, Cella, Harper & Scinto

(57) ABSTRACT

With an information processing apparatus configured such that an OS holds a print setting value of a printer, it is possible to change print settings to those that match the user's intention, when a printer to be used is changed. When the user has selected a printer to be used from a plurality of printers through a user interface provided by the OS, a printer driver among a plurality of printer drivers corresponding to the printer used after the change displays a user interface that displays a message to the effect that the printer has been changed. By this user interface, the user is allowed to select one of a plurality of presets held by the OS. After the selection, information of the selected preset is supplied to the OS.

7 Claims, 20 Drawing Sheets

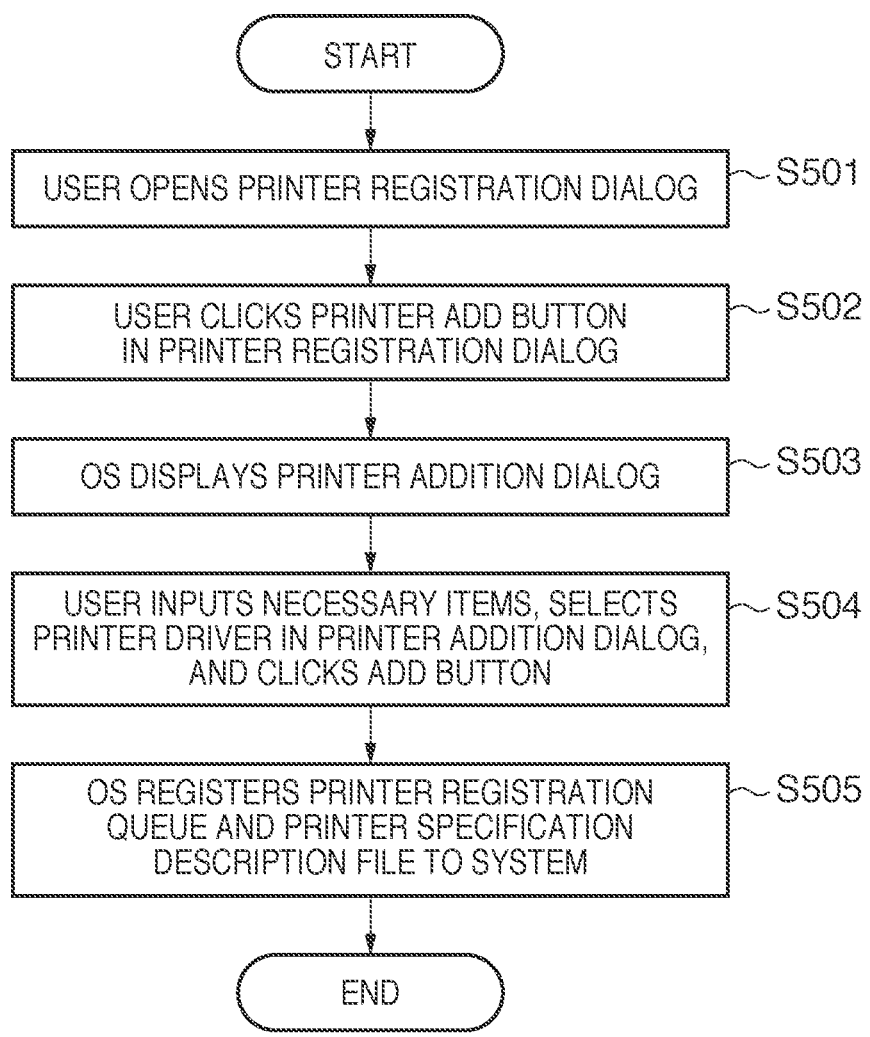

FIG. 8A

```
901: <Printer PrinterC_192.168.1.10_>
902:    Info PrinterC
903:    Location 2F
904:    DeviceURI lpd://192.168.1.10
905:    DriveName ABC PDL1
906: </Printer>
```

FIG. 8B

```
1001: *% Printer Description for PrinterC
1002: *Manufacuturer: "ABC"
1003: *Product: "PrinterC"
1004: *PrinterLanguage: ABC PDL1
1005: *DriverVersion: "PDL1 1.00"

1006: *OpenUI *PageSize: PickOne
1007: *DefaultPageSize: A4
1008: *PageSize A3
1009: *PageSize A4
       . . . . . .
1010: *CloseUI *PageSize 1011: *OpenUI *Duplex: PickOne
1012: *DefaultDuplex: None
1013: *Duplex None
1014: *Duplex Simplex
1015: *Duplex Duplex
1016: *CloseUI *Duplex
```

FIG. 9

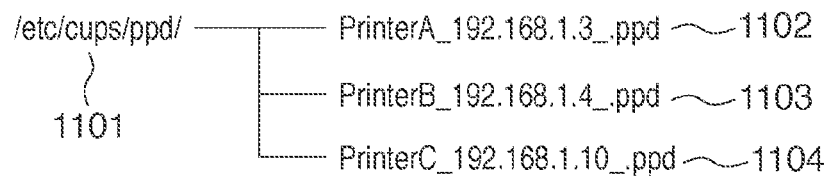

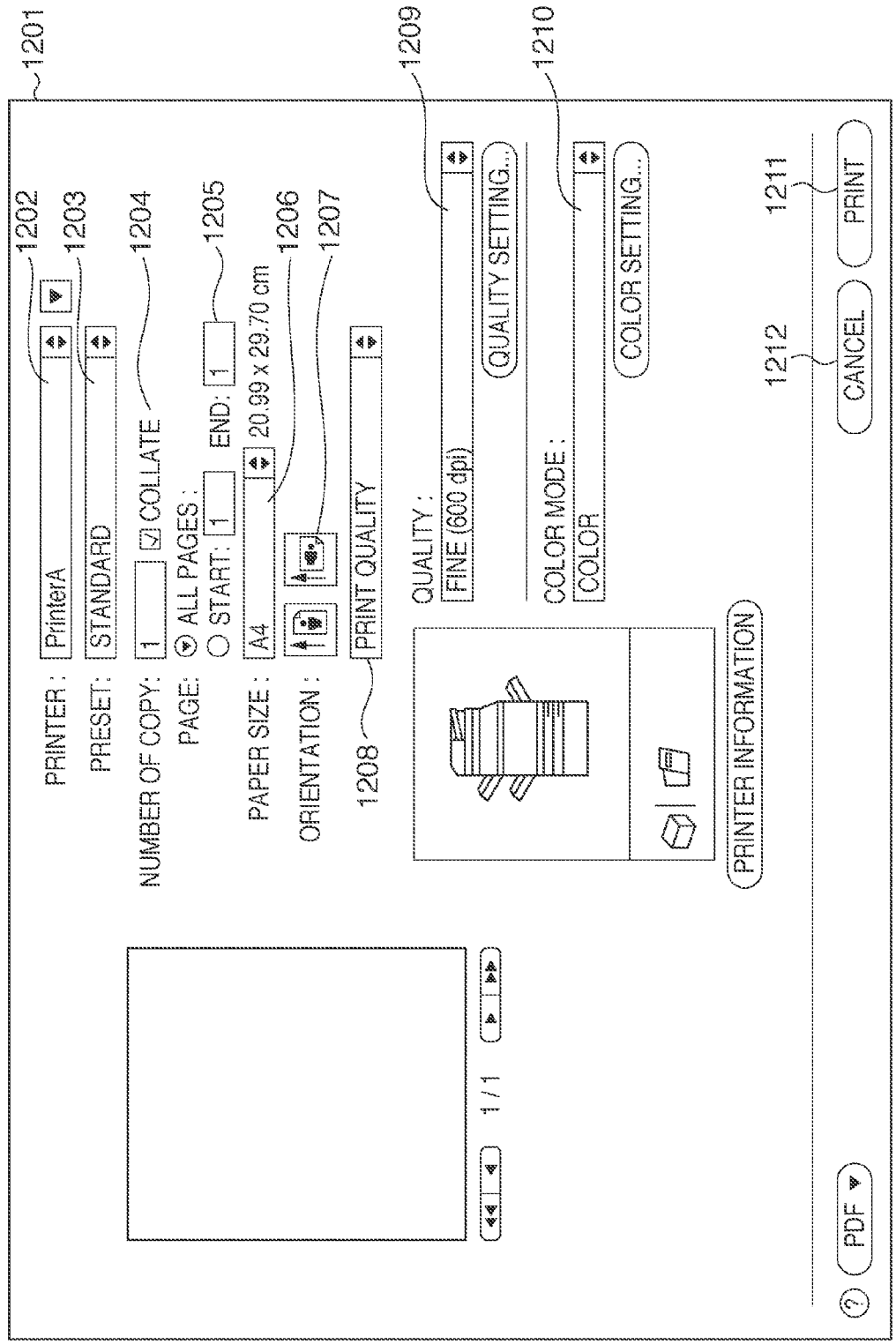

FIG. 11A

```
1301 : <DefaultPrinterInfo>
1302 :     DefaultPrintQueue PrinterA
1303 : </DefaultPrinterInfo>
```

FIG. 11B

```
1401 : <CustomPresetsList>
1402 :     <LastPresetInfo>
1403 :         LastPreset Standard
1404 :     </LastPresetInfo>
1405 :     <PresetSettings name="standard">
1406 :     </PresetSettings>
1407 :     <PresetSettings name="Preset-1">
1408 :         Duplex      false
1409 :         number-up 2
1410 :         ABC.Resolution 600
1411 :         ABC.StaplePosition upper-left
1412 :     </PresetSettings>
1413 : </CustomPresetsList>
```

FIG. 11C

```
1501 : <CurrentPrintQueueInfo>
1502 :     <CurrentPresetInfo>
1503 :         CurrentPreset Standard
1504 :     </CurrentPresetInfo>
1505 :     <CurrentSettings>
1506 :         Duplex      false
1507 :         number-up 2
1508 :         ABC.Resolution 600
1509 :         ABC.StaplePosition upper-left
1510 :     </CurrentSettings>
1511 : </CurrentPrintQueueInfo>
```

FIG. 13

```
1701 : *% Printer Description for PrinterA
1702 : *Manufacuturer: "ABC"
1703 : *Product: "PrinterA"
1704 : *PrinterLanguage: ABC PDL1
1705 : *DriverVersion: "PDL1 1.00"

1706 : *OpenUI *Duplex: PickOne
1707 : *DefaultDuplex: Simplex
1708 : *Duplex: Simplex
1709 : *Duplex: Duplex
1710 : *CloseUI *Duplex
       ......
1711 : *OpenUI *Number-up: PickOne
1712 : *DefaultNumber-up: 1
1713 : *Number-up: 1
1714 : *Number-up: 2
1715 : *Number-up: 4
1716 : *Number-up: 6
1717 : *Number-up: 8
1718 : *Number-up: 9
1719 : *Number-up: 16
1720 : *CloseUI * Number-up
       ......
1721 : *OpenUI *Resolution: PickOne
1722 : *DefaultResolution: 600dpi
1723 : *Resolution: 600dpi
1724 : *Resolution: 1200dpi
1725 : *CloseUI *Resolution
       ......
1726 : *OpenUI *StaplePosition: PickOne
1727 : *DefaultStaplePosition: none
1728 : *StaplePosition: none
1729 : *StaplePosition: 1
1730 : *StaplePosition: 2
1731 : *StaplePosition: 4
1732 : *StaplePosition: 6
1733 : *StaplePosition: 8
1734 : *StaplePosition: 9
1735 : *StaplePosition: 16
1736 : *CloseUI * StaplePosition
```

FIG. 15

| PRESET | | Standard 1901 | Preset-1 DRIVER OF ABC COMPANY 1902 | Preset-2 DRIVER OF DEF COMPANY 1903 |
|---|---|---|---|---|
| COMMON SETTINGS | DOUBLE-SIDED PRINTING | (INITIAL VALUE OF DRIVER) | Off | On |
| | LAYOUT | (INITIAL VALUE OF DRIVER) | 2-up | 4-up |
| | RESOLUTION | (INITIAL VALUE OF DRIVER) | 600 dpi | 1200 dpi |
| MODEL-SPECIFIC SETTINGS | STAPLE POSITION | (INITIAL VALUE OF DRIVER) | NONE | UPPER LEFT |

FIG. 17A

| PRESET | | Standard | ~2301 |
|---|---|---|---|
| COMMON SETTINGS | DOUBLE-SIDED PRINTING | (INITIAL VALUE OF DRIVER) | |
| | LAYOUT | (INITIAL VALUE OF DRIVER) | |
| MODEL-SPECIFIC SETTINGS | RESOLUTION | (INITIAL VALUE OF DRIVER) | |
| | STAPLE POSITION | (INITIAL VALUE OF DRIVER) | |

FIG. 17B

| PRESET | | Preset-2 DRIVER OF DEF COMPANY | ~2302 |
|---|---|---|---|
| COMMON SETTINGS | DOUBLE-SIDED PRINTING | On | |
| | LAYOUT | 4-up | |
| MODEL-SPECIFIC SETTINGS | RESOLUTION | 1200 dpi | |
| | STAPLE POSITION | UPPER LEFT | |

FIG. 17C

| PRESET | | Preset-1 DRIVER OF ABC COMPANY | ~2303 |
|---|---|---|---|
| COMMON SETTINGS | DOUBLE-SIDED PRINTING | Off | |
| | LAYOUT | 2-up | |
| MODEL-SPECIFIC SETTINGS | RESOLUTION | 600 dpi | |
| | STAPLE POSITION | NONE | |

F I G. 18A

```
2101 : <CustomPresetsList>
2102 :     <LastPresetInfo>
2103 :        LastPreset Standard
2104 :     < / LastPresetInfo>
2105 :     <PresetSettings name="Standard">
2106 :     < / PresetSettings>
2107 :     <PresetSettings name="Preset-1">
2108 :        ABC. QueueDescription "ABC PrinterA"
2109 :     < / PresetSettings>
2110 :     <PresetSettings name="Preset-2">
2111 :        DEF. PrinterName "DEF PrinterD"
2112 :     < / PresetSettings>
2113 :     <PresetSettings name="Preset-3">
2114 :        ABC. QueueDescription "ABC PrinterB"
2115 :     < / PresetSettings>
2116 :     <PresetSettings name="Preset-4">
2117 :        ABC. QueueDescription "ABC PrinterA"
2118 :     < / PresetSettings>
2119 :     <PresetSettings name="Preset-5">
2120 :        ABC. QueueDescription "ABC PrinterA"
2121 :     < / PresetSettings>
          . . . . . .
2122 :     <PresetSettings name="Preset-8">
2123 :        ABC. QueueDescription "ABC PrinterC"
2124 :     < / PresetSettings>
2125 :     <PresetSettings name="Preset-9">
2126 :        ABC. QueueDescription "ABC PrinterB"
2127 :     < / PresetSettings>
2128 : < / CustomPresetsList>
```

FIG. 18B

```
2401 : <CustomPresetsList>
2402 :    <LastPresetInfo>
2403 :       LastPreset Standard
2404 :    </LastPresetInfo>
2405 :    <PresetSettings name="Standard">
2406 :    </PresetSettings>
2407 :    <PresetSettings name="Preset-1">
2408 :       ABC. QueueDescription "ABC PrinterA(PDL1)"
2409 :    </PresetSettings>
2410 :    <PresetSettings name="Preset-2">
2411 :       DEF. PrinterName "DEF PrinterD"
2412 :    </PresetSettings>
2413 :    <PresetSettings name="Preset-3">
2414 :       ABC. QueueDescription "ABC PrinterB(PDL1)"
2415 :    </PresetSettings>
2416 :    <PresetSettings name="Preset-4">
2417 :       ABC. QueueDescription "ABC PrinterA(PDL2)"
2418 :    </PresetSettings>
2419 :    <PresetSettings name="Preset-5">
2420 :       ABC. QueueDescription "ABC PrinterA(PDL1)"
2421 :    </PresetSettings>
2422 :    <PresetSettings name="Preset-6">
2423 :       DEF. PrinterName "DEF PrinterE"
2424 :    </PresetSettings>
2425 :    <PresetSettings name="Preset-7">
2426 :       GHI. PrinterQueue "GHI PrinterGHI"
2427 :    </PresetSettings>
2428 :    <PresetSettings name="Preset-8">
2429 :       ABC. QueueDescription "ABC PrinterC(PDL1)"
2430 :    </PresetSettings>
2431 :    <PresetSettings name="Preset-9">
2432 :       ABC. QueueDescription "ABC PrinterA(PDL2)"
2433 :    </PresetSettings>
2434 : </CustomPresetsList>
```

FIG. 21C

PLEASE SELECT FROM THE PRESETS LISTED BELOW.

```
Preset-1    (ABC PrinterA PDL1)
Preset-3    (ABC PrinterB PDL1)
Preset-5    (ABC PrinterA PDL1)
Preset-8    (ABC PrinterC PDL1)
```

[ CANCEL ]   [ OK ]

FIG. 21D

PLEASE SELECT FROM THE PRESETS LISTED BELOW.

```
Preset-1    (ABC PrinterA PDL1)
Preset-4    (ABC PrinterA PDL2)
Preset-5    (ABC PrinterA PDL1)
```

[ CANCEL ]   [ OK ]

CONTROLLING AN INFORMATION PROCESSING APPARATUS ON WHICH A PLURALITY OF PRINTER DRIVERS ARE INSTALLED

BACKGROUND OF THE INVENTION

1. Field of the Invention

The present invention relates to print setting processing in an information processing apparatus including a printer driver.

2. Description of the Related Art

Conventionally, there are several methods with respect to handling of print setting values when a user gives an instruction for changing the output destination printer in an environment in which a plurality of printer drivers are installed on a client computer. "Instruction for changing a printer" used herein specifically corresponds to the case in which occurrence of print queue switching has been detected. Here, when a printer driver is installed, a print queue is registered in the installation target apparatus by an operating system (OS) in order to output print jobs to a printer corresponding to the printer driver.

When a print queue is switched on a client computer on which a plurality of printer drivers are installed, the operation performed with respect to print setting values differs depending on the OS. There are several methods for such an operation.

A first method is based on the idea that the printer drivers or print queues are mutually independent. In this case, if the user switched the output destination print queue when he/she makes a print request, the print setting values of the print queue before switching and those after switching are mutually independent. Therefore, the print setting values of the print queue before switching are not carried over. In connection with this method, Japanese Patent Laid-Open No. 2004-126940 proposes a method in which print setting values are carried over at the time of print queue switching. According to Japanese Patent Laid-Open No. 2004-126940, when a print queue is switched, the settings of the print queue to be switched from are searched for data that is usable in the print queue to be switched to. With this method, when data that will be effective in a print queue to be switched to is retrieved, setting information set in the print queue to be switched from is delivered to the print queue to be switched to.

The second method assumes a system environment different from that of the first method, in which the OS itself holds print setting values across a plurality of print queues. In this environment, every time the user switches a print queue, the OS intervenes to cause print setting values to be carried over between the print queues before and after switching.

The present invention relates to the second method, namely, a method in which the OS holds print setting values across printer drivers. The user may receive the advantage of this method when the user finds that an output destination print queue is not the one he/she desires after performing print setting in the print queue, and thus switches the print queue. In the case where set values are not carried over based on the idea that the print queues are mutually independent as in the first method, in the situation described above, the user needs to perform print settings again in the print queue switched to. In contrast, in the case where the OS holds the print setting values across print queues according to the second method, settings made in a certain print queue are carried over to the print queue switched to, which achieves the advantage that the user does not need to perform the print settings again.

However, with the second method, if default set values for the same setting item are different between print queues before and after switching, this scheme causes a problem. Here, default values set in each print queue denote values that are registered in correspondence to the print queue as an initial setting for the printer corresponding to the print queue, when output is performed with the printer. For example, with respect to two print queues each capable of being set to monochrome/color, the case is considered in which the default value of a print queue A is monochrome, and that of a print queue B is color. At this time, when the user switches from the print queue A to the print queue B, since the default value of the print queue B is color, naturally, the monochrome/color setting is expected to be color. However, the OS causes the print setting values to be carried over, and thus the monochrome/color setting of the print queue B will still be monochrome, due to the setting in the print queue A having been carried over.

Also, it is possible to save a combination of print settings that the user desires to apply to each printer under a certain name, and this saved combination is called a "preset". When printing is requested, by selecting a preset after selecting an output destination printer, the user can easily invoke a combination of print setting values that has been saved in advance. Here, the above-described OS manages presets across a plurality of print queues. The preset is stored with common settings that can be set in all print queues, and model-specific settings that can be realized uniquely in each print queue. For example, the common settings correspond to "designation of copy number" representing the number of copies to be printed, and "layout" designating how many pages are arranged on the print face. Also, model-specific settings correspond to settings that can be set in the print queue corresponding to the printer of a model to which various options are attached, such as, for example, case printing, and designation of folding such as C-folding and Z-folding.

Such a preset is set because the user desires to print out under the print settings of the preset. However, there may be a case in which when a print queue is switched after setting a preset, set values of the set preset are invalidated. Layout setting is taken as an example. In the case where a preset including a layout setting of 4-Up (a setting for arranging four pages per print face) is created in the print queue A, it is assumed that the print queue A is applied to inexpensive printers that are mainly used for test printing. In contrast, the print queue B is intended to be applied to advanced printers that are mainly used for creating end products such as POD (Print on Demand). At this time, when the user initially sets the preset in the print queue A, the layout setting included in the common settings is set to 4-Up, as desired by the user. Here, after it is confirmed in the test printing that there is no problem, the print queue A is switched to the print queue B for final printing, but the layout setting, which is a common setting, will still be 4-Up. Therefore, 4-Up printing is performed in the final printing as well. In addition, for example, with respect to model-specific settings such as designation of the resolution, which are not covered by the common settings, the details of the model-specific settings are not carried over at the time of print queue switching. As a result, in the case where the initial value of the designation of the resolution in the print queue B is 600 DPI, if the print queue A whose resolution designation is 1200 DPI is switched to the print queue B, there is an issue that the resolution is set to 600 DPI.

SUMMARY OF THE INVENTION

The present invention enables, with the above-described OS configured to manage print setting values set in a print job across a plurality of drivers, print settings to be changed to those that match the user's intention when an output destination printer is changed.

According to the aspect of the present invention, there is provided a method for controlling an information processing apparatus on which a plurality of printer drivers are installed, the method comprising the steps of: under the control of an operating system having a function of sharing among the plurality of printer drivers a set value to be set in a print job that is sent to a printer, performing, following a change of a printer that serves as an output destination among a plurality of printers corresponding to the plurality of printer drivers, display control of a screen for selecting, as print setting information used for performing print setting of a print job that is sent to the post-change printer, one of print setting information that is held after being set by using a printer driver corresponding to a pre-change printer, default print setting information of a printer driver corresponding to the post-change printer, and print setting information set in a preset that is registered by a user and managed by the operating system; and obtaining print setting information corresponding to the selection made through the screen displayed in the display control step, wherein the print setting information obtained in the obtaining step is applied to a screen for setting print settings for a print job that is sent to the post-change printer.

Further features of the present invention will become apparent from the following description of exemplary embodiments (with reference to the attached drawings).

BRIEF DESCRIPTION OF THE DRAWINGS

FIG. 5 is a flowchart illustrating a procedure for registering a print queue.

FIG. 8A is a diagram illustrating an example of print queue registration information.

FIG. 8B is a diagram illustrating an example of a printer specification description file.

FIG. 9 is a diagram illustrating an example of storage locations of printer specification description files.

FIG. 10 is a diagram illustrating an example of a print setting dialog.

FIG. 11A is a diagram illustrating an example of a default printer save file.

FIG. 11B is a diagram illustrating an example of a preset setting save file.

FIG. 11C is a diagram illustrating an example of print setting information.

FIG. 13 is a diagram illustrating an example of the printer specification description file of Printer A.

FIG. 15 is a diagram illustrating an example of setting details of a preset.

FIGS. 17A to 17C are diagrams illustrating examples of setting details of presets.

FIGS. 18A and 18B are diagrams illustrating examples of the content of preset information save files.

FIGS. 21A to 21D are diagrams illustrating examples of preset selection screens.

DESCRIPTION OF THE EMBODIMENTS

Preferred embodiments of the present invention will now be described hereinafter in detail, with reference to the accompanying drawings. Note that the present invention is not limited to the following embodiments, and the embodiments merely show specific examples advantageous in implementing the present invention. Also, not all of the combinations of the aspects that are described according to the following embodiments are necessarily required in order to solve the problems according to the present invention.

System Configuration

Figure 1:
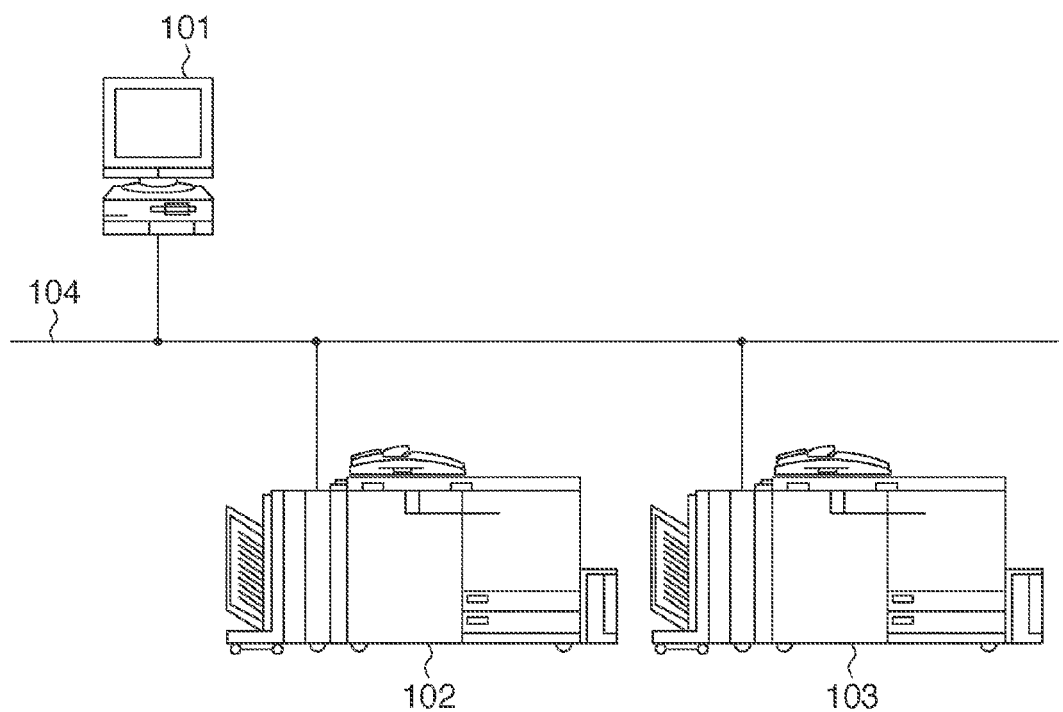
FIG. 1 is a diagram illustrating a configuration of a printing system according to an embodiment of the invention.

FIG. 1 illustrates an example of a printing system to which the present invention is applied. A client computer 101 serving as an information processing apparatus and printers 102 and 103 are each connected to a network 104. An operating system (hereinafter referred to as an "OS"), application programs and printer drivers are installed on the client computer 101. The client computer 101 can send user data to the printer 102 or the printer 103 via the network 104 according to the user's instruction. The printer 102 or the printer 103, having received the user data, prints the user data.

Figure 2A:
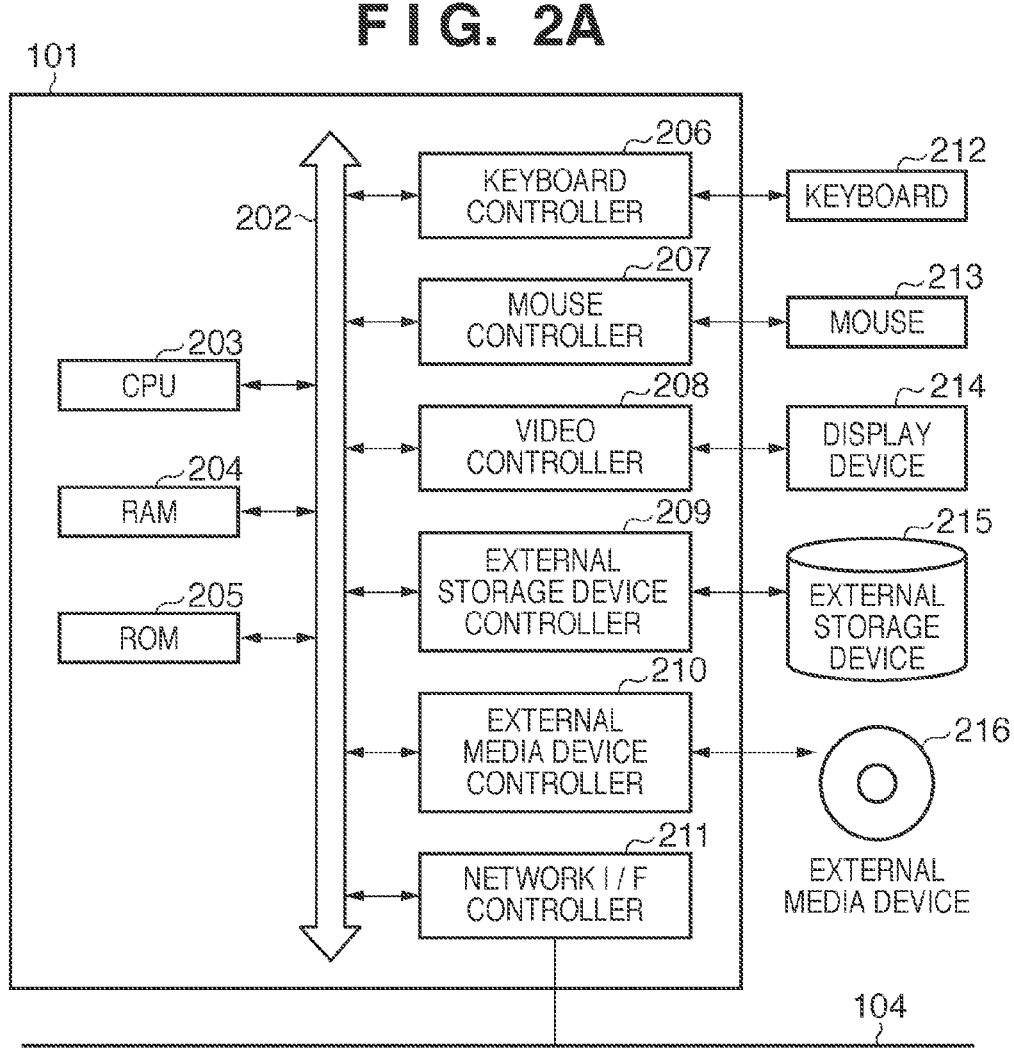
FIG. 2A is a block diagram illustrating a configuration of a client computer according to an embodiment of the invention.

FIG. 2A is a block diagram illustrating the configuration of the client computer 101. The client computer 101 includes a CPU 203 that controls the client computer 101, a RAM 204 that functions as a main storage device and provides a work area for use by the CPU 203, a ROM 205 that stores fixed data and programs, and other elements described below. A bus 202 enables data exchange between elements connected thereto. A keyboard controller 206 transmits information from a keyboard 212 to the CPU 203 via the bus 202. A mouse controller 207 transmits information from a mouse 213 to the CPU 203 via the bus 202. A video controller 208 controls image display by a display device 214. An external storage device controller 209 controls an external storage device 215 such as a hard disk drive. An external media device controller 210 controls an external media device 216 accommodating a CD-ROM, DVD, and the like. A network I/F controller 211 is connected to the network 104 and performs communication.

Figure 2B:
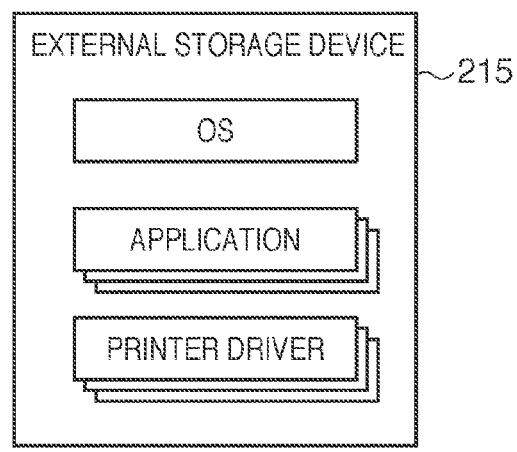
FIG. 2B is a diagram illustrating an example of storage content of an external storage device.

Generally, an initial program for starting up the client computer 101 or basic programs for controlling the modules of the client computer 101 are saved in the ROM 205. In addition, as shown in FIG. 2B, one or more application programs (hereinafter simply referred to as "applications") including an OS, and one or more printer drivers may be installed on the external storage device 215. The OS has a function for causing set values to be set in a print job to be sent to a printer to be shared by a plurality of printer drivers. For example, MacOS X® of Apple Inc. may be used as the OS. Note that the procedure for installing a printer driver is described later. When the client computer 101 is turned on, a start-up program (bootloader) saved in the ROM 205 is executed. The program loads the OS saved in the external storage device 215 to the RAM 204, and then transfers control to the OS. The OS further loads from the external storage device 215 necessary modules, drivers and the like to the RAM 204. Furthermore, in response to the user's instruction, the OS loads from the external storage device 215 necessary application programs to the RAM 204, which are then executed by the CPU 203.

The printer driver and the installer thereof can be supplied by an external medium such as a CD-ROM. When the external medium is set to the external media device 216, the CPU 203 loads programs and data from the external media to the RAM 204 as necessary, or saves them in the external storage device 215.

Printer Driver Installation and Print Queue Registration

Figure 3:
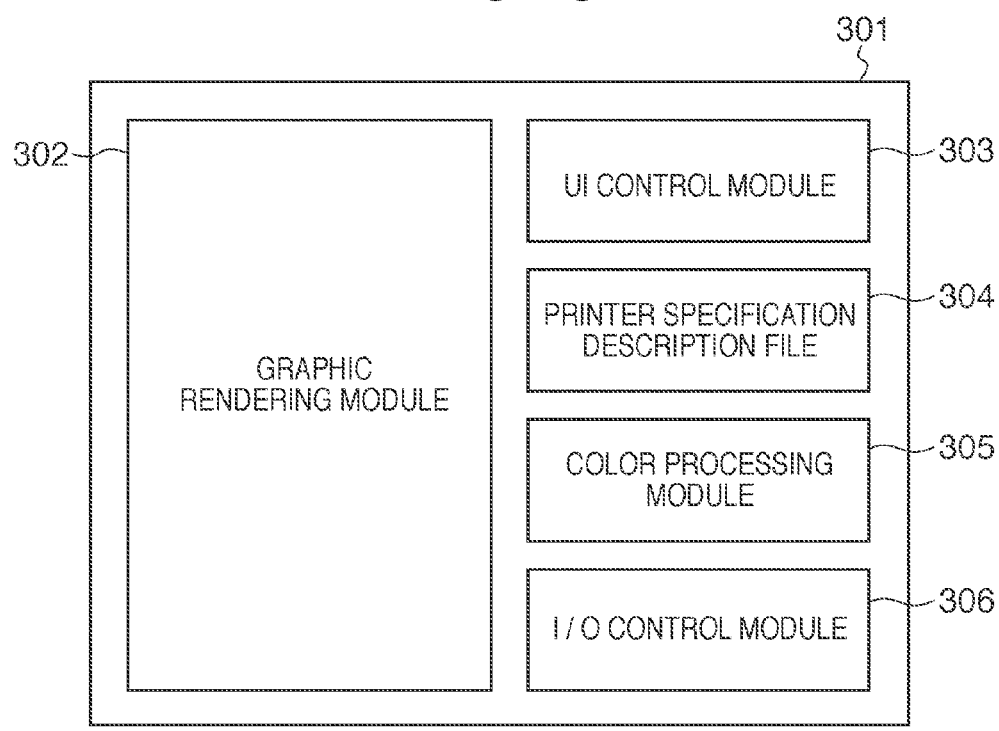
FIG. 3 is a diagram illustrating a module configuration of a printer driver.

Firstly, the configuration of a printer driver is described. A printer driver to be installed is, for example, configured from a module group shown in FIG. 3. A printer driver 301 includes a graphic rendering module 302, a UI control module 303, a printer specification description file 304, a color processing module 305, and an I/O control module 306. Note that other modules can be included depending on the function of the printer driver.

The printer driver can be configured in several manners. For example, in order to support a plurality of printers by a single printer driver, the printer driver is configured such that the graphic rendering module 302 and the UI control module 303 can support a plurality of printers. Also, the number of the printer specification description files 304 contained in the printer driver is the same as the number of printers to be supported. With such a configuration, the UI control module 303 performs display control of the user interface (UI) according to the printer specification description files 304. The graphic rendering module 302 is configured to issue page description languages and printer control commands in accordance with the printers.

Figure 4:
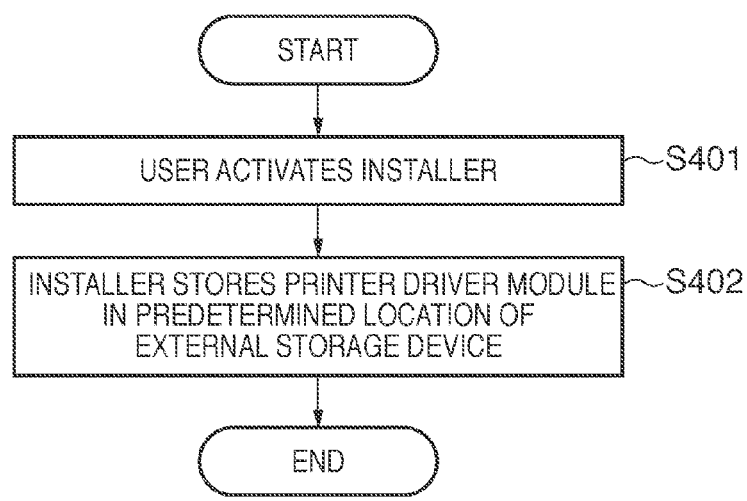
FIG. 4 is a flowchart illustrating a procedure for installing a printer driver.

Next, the procedure for installing the printer driver 301 to the client computer 101 is described. FIG. 4 is a flowchart illustrating a procedure for installing the printer driver 301. It is assumed that the user has already obtained a CD-ROM in which the printer driver 301 is stored, or a printer driver installer via network. In step S401, the user activates the obtained printer driver installer. In step S402, in response to this, the installer stores the printer driver module in a predetermined location in the external storage device 215. Although the storage location differs depending on the printing system, with CUPS (Common Unix Printing System), for example, printer driver modules for each vendor are stored in the following directory.

/Library/Printers/

Also, it is possible to store printer drivers according to their types in a directory for each vendor. For example, if there are two different printer drivers of the vender ABC, namely, PDL1 and PDL2, it is possible to create the following directories, and store these printer drivers in the directories, respectively.

/Library/Printers/ABC/PDL1/
/Library/Printers/ABC/PDL2/

In step S402, the printer driver modules are stored in directories predetermined in this manner. Installation of the printer driver is thereby completed, but in order to actually output a print job to a printer, the user needs to register the printer by using the printer driver. FIG. 5 illustrates an example procedure for registering a print queue.

Figure 6A:
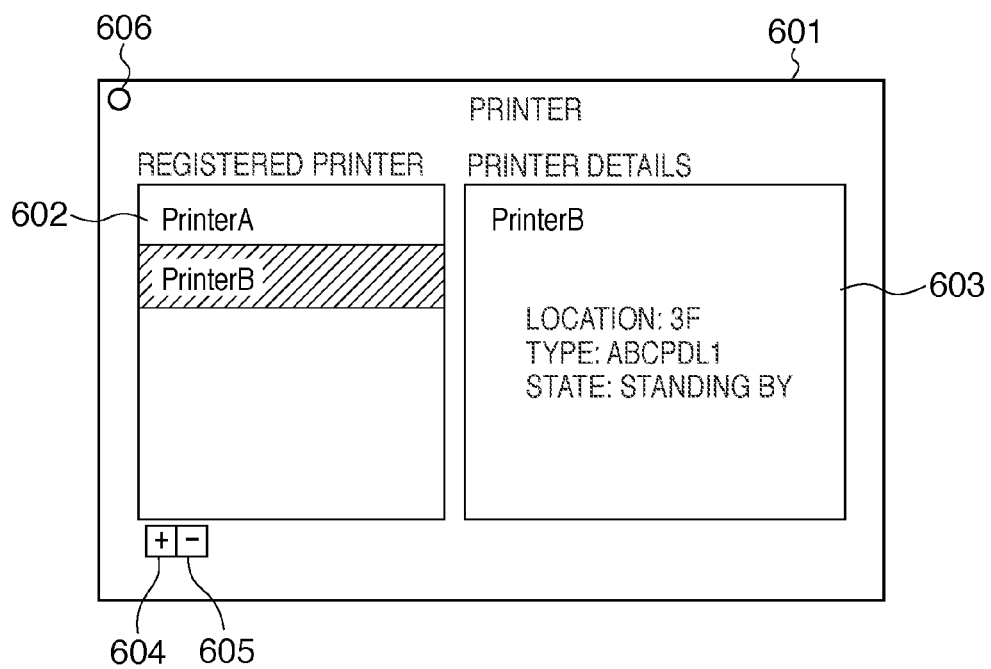
FIG. 6A is a diagram illustrating an example of a printer registration dialog.

In step S501, the user performs an operation for opening a printer registration dialog by using the keyboard 212 or the mouse 213. The OS responds to this operation, and loads program code for printer registration from the external storage device 215 to the RAM 204, and executes the program code. FIG. 6A is a diagram illustrating an example of the printer registration dialog displayed by the OS. A dialog 601 includes a registered print queue list 602 for displaying the list of currently-registered printers, and a printer details display area 603 for displaying detailed information of the printer selected in the registered print queue list 602. In addition, the dialog 601 includes an add button 604 for additionally registering a print queue, a delete button 605 for deleting a printer selected in the registered print queue list 602, and a button 606 for closing the dialog 601.

Figure 6B:
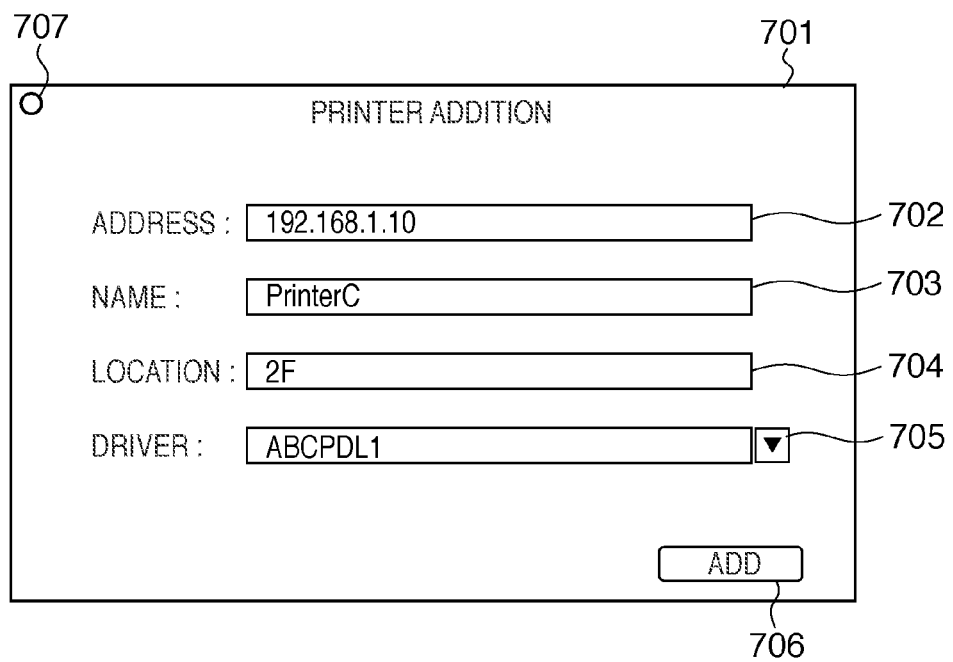
FIG. 6B is a diagram illustrating an example of a printer addition dialog.

In step S502, the user clicks on the add button 604 with the mouse 213. In response to this user operation, the OS displays a printer addition dialog in step S503. The user can input necessary information to the dialog displayed here in step S504, thereby adding a printer. FIG. 6B illustrates an example of a print queue addition dialog. In a print queue registration dialog 701 in FIG. 6B, reference numeral 702 denotes a control for designating the network address (IP address in this case) of the connected printer. Reference numeral 703 denotes a control for inputting a printer name. Reference numeral 704 denotes a control for inputting the location where the printer is installed. The printer name in 703 and the location of the printer in 704 serve as character strings that are used when displayed in the registered print queue list (602) and the printer details (603). Reference numeral 705 denotes a control for designating the printer driver when a print queue is registered. The printer drivers listed here are listed as a result of the OS listing the printer drivers stored in the above-described printer driver storage directory (/Library/Printers) of the OS. In the example of FIG. 6B, the address is 192.168.1.10, the name of the print queue is "Printer C", the location is "2F", and the selected printer driver is "ABC PDL1". When an add button 706 is clicked in this state, the OS adds a print queue. Note that a dialog closing button 707 is clicked for closing the dialog without adding a print queue.

In step S505, the OS registers the print queue designated by the user in the system. The processing in this step is described in detail below.

Figure 7:
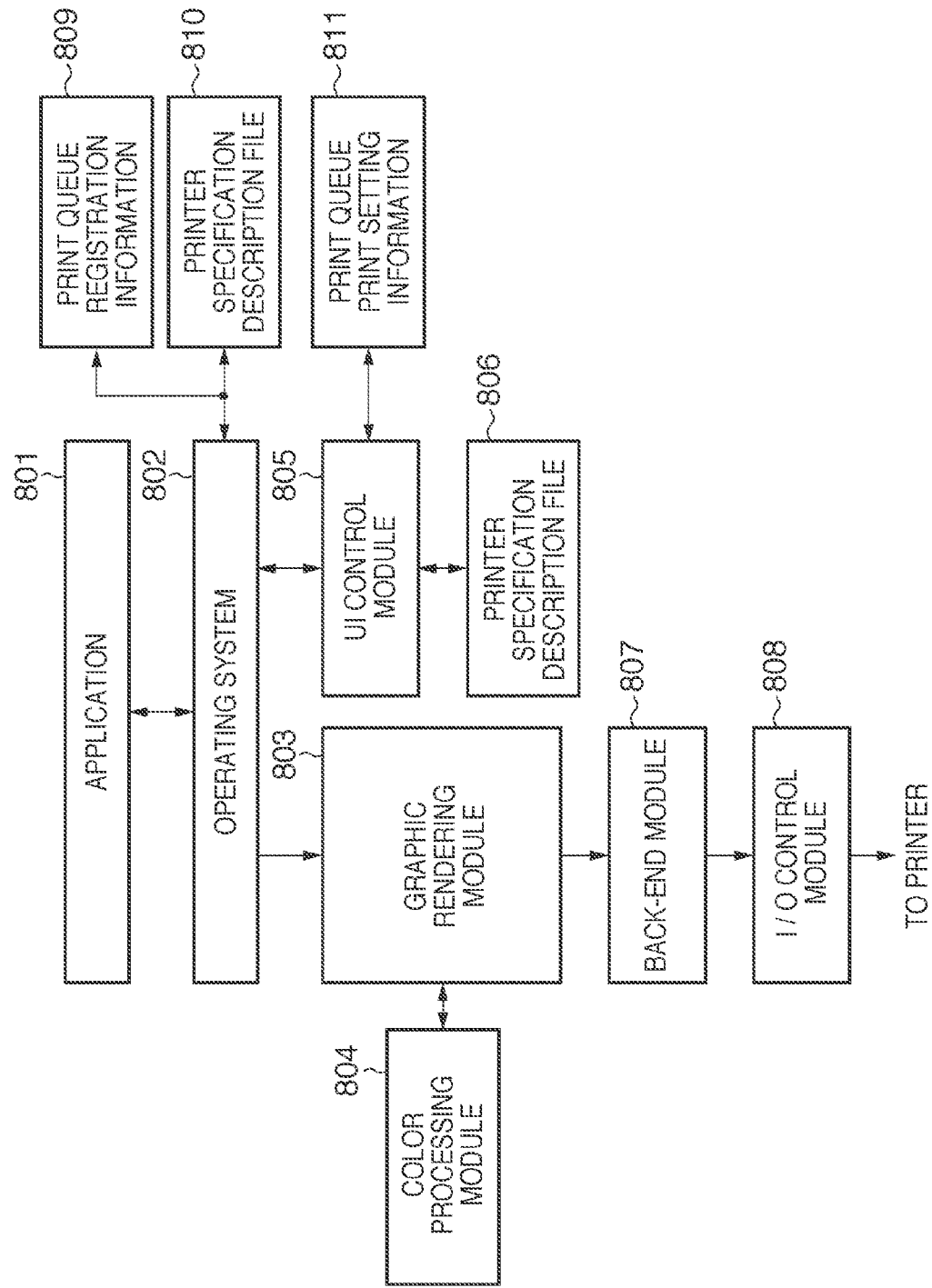
FIG. 7 is a block diagram illustrating a configuration of a printing system.

FIG. 7 is a block diagram of the printing system in a state in which a printer driver is installed and further a print queue is registered. In FIG. 7, a graphic rendering module 803 is the graphic rendering module 302 of the printer driver installed in the predetermined directory (/Library/Printers/) of the OS according to the above-described procedure. A UI control module 805 is the UI control module 303 of the printer driver installed similarly. A color processing module 804 is the color processing module 305 of the installed printer driver. An I/O control module 808 is the I/O control module 306 of the installed printer driver. Also, a printer specification description file 806 is the printer specification description file 304 of the installed printer driver. A back-end module 807 is provided by the OS, and is a module for delivering a print job generated by the graphic rendering module 803 to the I/O control module 808 in order to send the print job to the printer. Also, a print queue registration information 809, a printer specification description file 810, print queue print setting information 811 are generated by the OS in the process of printer registration in FIG. 5, and the process is described below in detail.

In step S505, an OS 802 acquires information of the printer addition dialog and registers a printer. This registration is performed in the following manner. FIG. 8A illustrates an example of the print queue registration information, and is described in a markup language, for example. Reference numeral 901 denotes an identifier of the print queue, in which the printer address is described after the printer name with an underscore placed before the address. Reference numeral 902 denotes the printer name. Reference numeral 903 denotes the location. Reference numeral 904 denotes the actual print queue, and in this case, data is sent to the address 192.168.1.10 according to the LPD protocol. Reference numeral 905 denotes the name of the printer driver (in this case, ABC PDL1) used by the printer. Reference numeral 906 denotes the end of description of this printer. The OS creates this description in step S505, and adds the created information to a predetermined file of the external storage device 215. The predetermined file refers to, in CUPS system, for example, the "printers.conf" file held in the directory of "/etc/cups/". The created information serves as the print queue registration information 809. Note that in the case where a plurality of print queues are registered, the description of FIG. 8A is repeated for the number of print queues in files saved under the name "printers.conf", with respect to the printers to which the print queues respectively correspond.

Next, in step S505, the OS registers a printer specification description file in the system. The OS 802 obtains the printer specification description file 806 of the printer to be registered from the UI control module 805, and registers the printer specification description file 806 in a predetermined location in the printer specification description file 810.

The printer specification description file is described before describing the method for registering the same. FIG. 8B illustrates an example of the printer specification description file. This file is described according to the specification description format of the printer. Hereinafter, the description will be made while describing this format as well. 1001 describes a comment. The comment starts with "*%". 1002 describes a vender name. 1003 describes the printer name to which the printer specification description file corresponds. 1004 describes the page description language to which the printer specification description file corresponds. 1005 describes the version of the printer driver. After 1005, the function specification of the printer is described. In the function specification, the block starting from the line with "*OpenUI" to the line with "*CloseUI" represents one function. Following "*OpenUI", the function name is described starting with "*", the function name is followed by ":" as a delimiter, and thereafter the type of function applied when it is selected is described. The types include "PickOne" and "Boolean". "PickOne" indicates that the function selects one of selection options. The "Boolean" indicates that the function is subject to On/Off control. 1006 indicates that a function called "*PageSize" is available and that this function selects one of selection options. The following line of 1006 describes a default value of the function. This line starts with "*Default", and the function name defined in the preceding line is described after "*Default". This line indicates that the default value of the function called "PageSize" is A4. The selection options of the function are described in the lines from the following line (1008) to the line with "*CloseUI" (1010), each line describing one option. For example, 1008 indicates that A3 is one of the selection options of "PageSize". Note that the above lines describe a function for selecting a page size, and since the page size has many selection options, some of the options are not shown in the drawing. 1010 is the end of the description of the function, where the function name, which is described in the line starting with *OpenUI, is described after "*CloseUI". One function is expressed as described above. The block from 1011 to 1016 describes another function. While overlapping description is omitted, this block expresses that the function called "Duplex" is available, and this function selects one of the selection options that include "None", "Simplex" and "Duplex". This block actually expresses the function relating to designation of double-sided printing. "None" means employing a default setting of the printer since no particular option is designated, "Simplex" means single-side printing, and "Duplex" means double-sided printing.

Next, the method for the OS registering the printer specification description file is described. The OS obtains the printer specification description file 806 corresponding to a printer from the UI control module 805, and stores the same in a predetermined location of the system. FIG. 9 indicates the storage locations and stored files. The storage location is in the directory of "/etc/cups/ppd/" of the external storage device 215, and the name of the stored file is formed by adding the printer address to the printer name, with an underscore placed after the printer name. The printer specification description file added here is described as "PrinterC_192.168.1.10_.ppd" in 1104. In FIG. 7, it is indicated that the OS 802 has stored the obtained printer specification description file 806 in the printer specification description file 810.

With the steps described above, registration of the print queue is completed.

Print Queue and Preset Setting

Next, the print queue and the settings relating to the preset are described. FIG. 10 is a diagram illustrating an example of the print setting dialog of the registered print queue. FIG. 10 shows a dialog displayed when a "print" menu that appears in the file menu of an application and the like is selected. The user sets print attributes and issues a print instruction by using the dialog. In a print setting dialog 1201, 1202 to 1207 indicate common controls provided by the system. 1202 to 1207 enable selection of the print queue or below-described preset, and basic functions such as setting of the number of copy and designation of paper size. Settings of the functions unique to the printer can be performed with other portions in the print setting dialog 1201. When there are a number of printer functions, all functions are not displayed at one time, and instead displayed by switching the groups of the functions by 1208. As an example, FIG. 10 shows a state in which the functions relating to "print quality" are displayed. The functions relating to the print quality include quality (resolution) designation in 1209 and color mode designation in 1210, for example. There are also other various functions, display of which can be switched by designating other groups by the control 1208.

In this dialog, when the user desires to switch an output destination printer, such switching is made by the print queue selection control 1202. In the print setting dialog 1201, the print queue of the Printer A is currently selected. Here, if this control is clicked to select the Printer B, for example, the print queue of the Printer B enters a selected state. By clicking a print button 1211 in such a state, print output to the Printer B is performed.

Next, default print queue settings and a preset saved by the OS are described. FIG. 11A is an example of a file saving a print queue selected as default. 1301 and 1303 indicates tags thereof. The default-selected print queue is described between these tags with the key "DefaultPrintQueue", and 1302 indicates that the Printer A is selected. Note that since this file is saved for each user, the file is saved under the name "defaultprinter.plist" in the following directory (when the user name is USER_A).

/usr/USER_A/Library/Preferences/

FIG. 11B is a file saving setting details of the preset. The preset refers to a combination of print settings often used by the user that is saved under a certain name. For example, default settings of the preset of a certain print queue are single-side printing and 1-up printing. When the user often uses double-sided printing and 2-up printing, the print queue is opened, and double-sided printing and 2-up printing are set and saved under the name "preset". When the user desires to use these settings, the settings are realized by simply selecting the saved preset by using the preset selection control 1203. Hereinafter, saving of the settings of the preset is described.

In FIG. 11B, between the tags "CustomPresetList" in 1401 and 1413, setting details of a plurality of presets are described. A single preset is described between the tags "PresetSettings" as shown in 1405 and 1406. Note that as the parameter of "PresetSettings", the preset name thereof is described. The preset described in 1405 and 1406 indicates that the preset name is "Standard", and the setting details thereof are "null". Another preset, "Preset-1", is described in the block from 1407 to 1412 in the preset description file in FIG. 11B. The setting details of this preset are described in the block from 1408 to 1411. 1408 indicates that "Duplex" is set to "false" and 1409 indicates that the "number-up" (layout) is set to "2". 1410 indicates that "ABC.Resolution" is set to "600" and 1411 indicates that "ABC.StaplePosition" is set to "upper-left". Note that the identifier "ABC." is added to the head of several items. This is for distinguishing setting items for each vendor, since the OS manages presets and the presets are used in common for the vendors. As described above, according to this preset setting file, the type and setting details of each preset are known.

FIG. 11C shows an example of print setting information that the OS delivers to the UI control module of the printer driver corresponding to the print queue currently selected after invoking the UI control module, when the user has selected "print" from the application menu. The information is generated by the OS 802 in the memory during the application process, and delivered to the UI control module 805. The content of the print setting information is described below. The currently selected preset is described between the tags "CurrentPresetInfo" in 1502 and 1504. The OS 802 obtains the information of the currently selected preset from the description in 1403 of FIG. 11B, and describes the same between these tags. Here, it is indicated that the preset called "Standard" is selected. Next, details of the print settings are described in the block from 1506 to 1509. The print settings are described between the tags "CurrentSettings" in 1505 and 1510. The details of the settings are the same as those in FIG. 11B, and thus are not described here.

Figure 12:
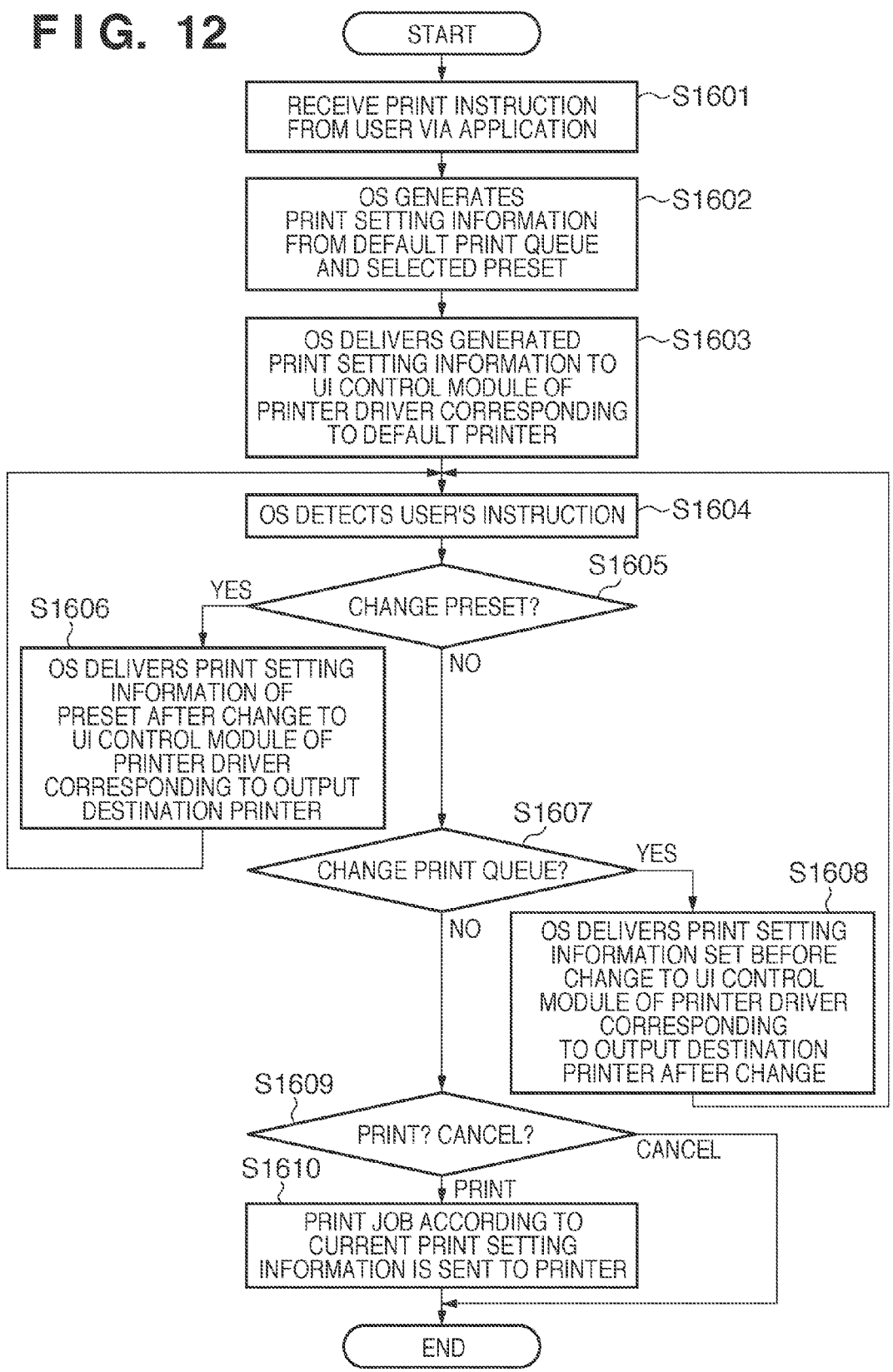
FIG. 12 is a flowchart illustrating an example of print control processing.

Next, events that occur from the user issuing a print instruction to printing and control processing associated with such events are described with reference to FIG. 12. In step S1601, the user selects "print" from the application menu. By using this operation as a trigger, the OS generates print setting information based on the print queue of the printer designated as a default output destination and the selected preset in step S1602. Specifically, such generation is performed as follows. Firstly, the OS reads out the file saved under the name "defaultprinter.plist" shown in FIG. 11A located in the directory "/usr/USER_A/Library/Preferences/". After that, information of the print queue of the printer designated as a default output destination is obtained. Here, it is known that "Printer A" is the print queue. Next, the OS reads out a printer description file of "Printer A". Specifically, the OS reads out the printer specification description file starting with "Printer A" from among the files in the directory of "/etc/cups/ppd/". FIG. 13 shows an example of the content of the printer specification description file of the Printer A. The format of this file is the same as that described in FIG. 8B, and thus is not described here.

Next, the OS extracts the printer function items and the default values thereof from the printer description file. Specifically, the function items are extracted by using the keyword "*OpenUI" in the printer specification description file in FIG. 13, and default values thereof are extracted from keywords starting with "*Default".

In FIG. 13, the following function items are extracted by using the keyword "*OpenUI".

Duplex
Number-up
Resolution
StaplePosition

Also, default values of the function items are extracted as described below by using the keywords "*Default".

| Duplex | Simplex |
|---|---|
| Number-up | 1 |
| Resolution | 600 |
| StaplePosition | none |

Based on the function items and default values extracted in this manner, the print setting information shown in FIG. 11C is generated. Note that "ABC." is added before the function items in 1508 and 1509 in FIG. 11C. This is for adding a sign for distinguishing each vendor since the print setting information is used across a plurality of print queues in the system, as described above. Furthermore, the information on the preset is also reflected in this step. First of all, the OS extracts the currently selected preset and the settings thereof from the file saved under the name "custompresets.plist" shown in FIG. 11B and located in the directory "/usr/USER_A/Library/Preferences/", which is a memory region of the preset. It is known from 1403 in FIG. 11B that the currently selected preset is "Standard", and the setting details thereof do not exist based on 1405 and 1406. Since no setting is designated in this example, the default print setting information shown in FIG. 11C that was generated in the procedure described above is not changed. However, when "Preset-1" is selected, the setting information in the block from 1408 to 1411 is overwritten by the information in the block from 1506 to 1509.

Next, in step S1603, the OS invokes the UI control module of the printer driver corresponding to the printer designated as the default output destination, and delivers the print setting information generated in step S1602 to the UI control module. Specifically, the print setting information shown in FIG. 11C is delivered to the UI control module 805 of "Printer A".

As a result of the procedure described so far, the print setting dialog 1201 of FIG. 10 is displayed. In this dialog, the user can change the print queue by the control 1202, change the preset by the control 1203, change the print settings by the control 1204 and other controls, and issue a print instruction by the control 1211 in any arbitrary order. Note that the print setting information set in the print setting dialog 1201 is temporarily managed by the printer driver (UI control module).

Operations performed in the steps are described below. The type of the operation by the user is determined in steps S1605, S1607, S1609 and S1610. Firstly, the user instruction is detected in step S1604, and an operation corresponding to the instruction is performed. In the case where the user instruction detected in step S1604 is preset change (YES in step S1605), the processing proceeds to step S1606. In step S1606, the OS delivers the print setting information of the selected preset to the UI control module of the printer driver corresponding to the printer designated as the current output destination via an API. For example, in the case where the user changed the preset from "Standard" to "Preset-1", the OS changes the preset name of the control 1403 in FIG. 11B from "Standard" to "Preset-1", and delivers the print setting information "Preset-1" to the UI control module. The UI control module updates the print setting dialog 1201 according to the delivered print setting information.

In the case where the user instruction detected in step S1604 is print queue change, that is, change the output destination printer (YES in step S1607), the procedure proceeds to step S1608. Here, the OS obtains the print setting information before change from the UI control module of the printer driver corresponding to the printer before change, via an API. Such obtaining may be performed every time the user changes the print settings, or may be performed when the print queue is changed. In step S1608, the OS delivers the print setting information that has been obtained to the UI control module of the printer driver corresponding to the printer serving as the output destination after change, via an API. Note that the operation on the side of the UI control module that received this print setting information is described in detail later.

In step S1609, it is determined whether the user instruction detected in step S1604 is a print instruction or a cancel instruction. In the case where the user instruction is determined to be a cancel instruction, the print setting dialog 1201 is closed without an operation being performed, thereby ending the procedure. In the case where the user instruction is a print instruction, the procedure proceeds to step S1610, and the OS obtains the currently set print setting information from the UI control module, and performs print control. Note that with this print control, the OS delivers the print setting information to the graphic rendering module 803 to perform print control processing. Thereafter, a print job is sent to the printer. The processing described here is general processing, and thus is not described in detail.

Preset Selection Method

Figure 14:
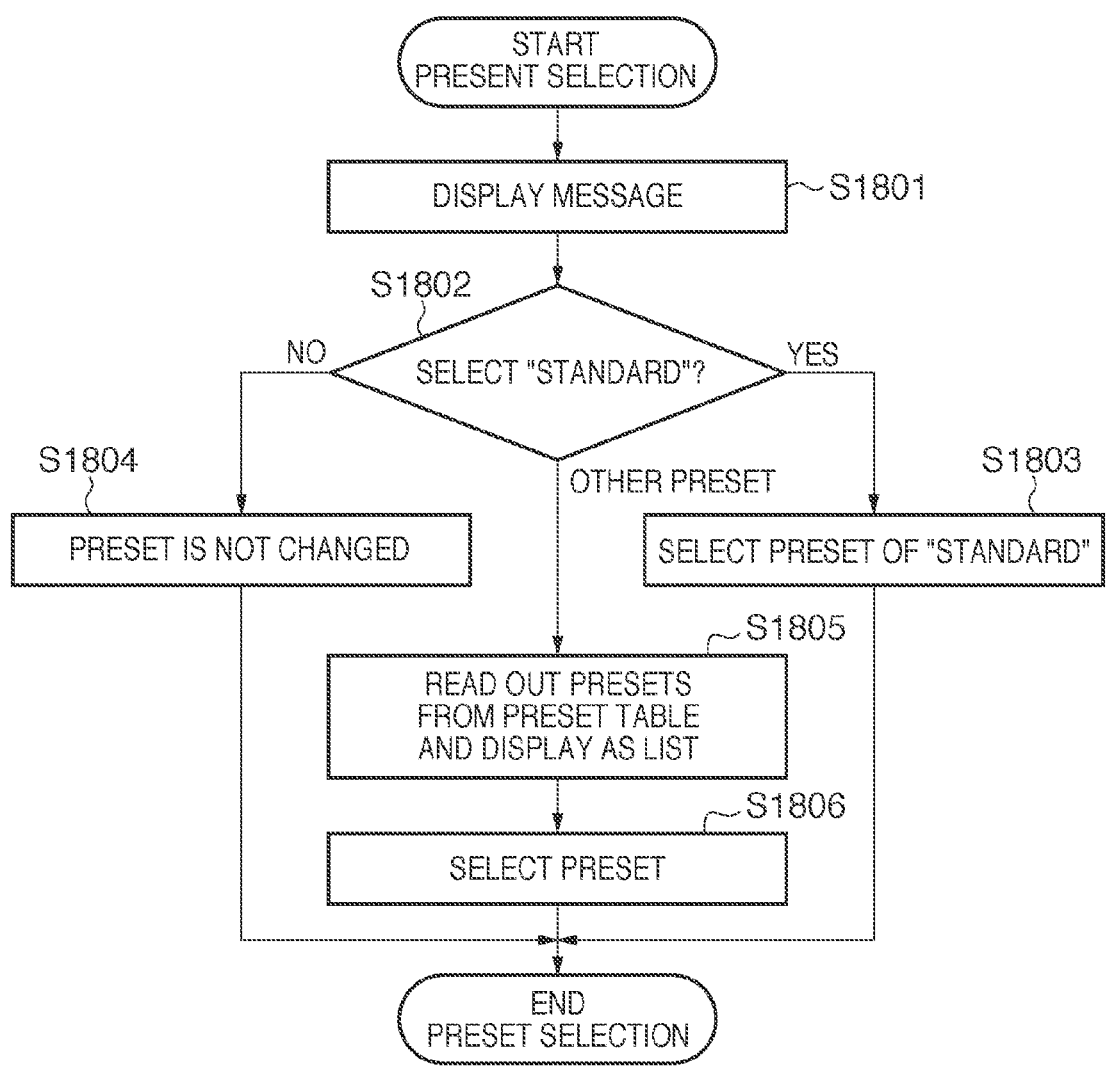
FIG. 14 is a flowchart illustrating processing for selecting a preset.

Next, the processing for selecting a preset is described. FIG. 14 is a flowchart illustrating the procedure of the preset selection processing. The flowchart is described while assuming the following situation. At least, "Printer A" that is a print queue registered in association with a printer driver of ABC Company and "Printer D" that is a print queue registered in association with a printer driver of DEF Company are registered in the OS. Next, an example of the setting details of the preset is shown in FIG. 15. In FIG. 15, there are three attributes of the preset, namely, "Standard" of 1901, "Preset-1" of 1902 and "Preset-2" of 1903. "Standard" of 1901 is a standard preset as its name indicates, in which the set value of each function item is set to "the initial value (default value) of the driver". As shown in 1405 and 1406 in FIG. 11, it is known that no specific set value is designated in "Standard". That is, in the case where "Standard" is designated as the preset, default print setting values held by the printer driver as initial values since installation thereof are used. Also, in "Preset-1" of 1902, double-sided printing and layout, which are common setting items, are set to Off and 2-up, respectively, and resolution and staple position, which are model-specific settings, are set to 600 dpi and none, respectively. This "Preset-1" is assumed to have been created by the print queue "Printer A". In "Preset-2" of 1903, double-sided printing and layout, which are common setting items, are set to On and 4-up, respectively, and resolution and staple position, which are model-specific settings, are set to 1200 dpi and upper left, respectively. This "Preset-2" is assumed to have been created by the print queue "Printer D".

Also in the following description, it is assumed that after the user has selected "print" from the application menu and opened the print setting dialog 1201, the following changes are made. "Printer A" that is a print queue corresponding to the printer serving as a default output destination is selected in the print setting dialog 1201. At this state, it is assumed that the user changed the print queue to "Printer D". Processing performed by the printer driver in such a state is described with reference to the flowchart in FIG. 14. The processing is executed by the CPU 203 under the control of the printer driver corresponding to the printer that has become the output destination due to the print queue change (hereinafter referred to as a "printer driver after change").

Figure 16:
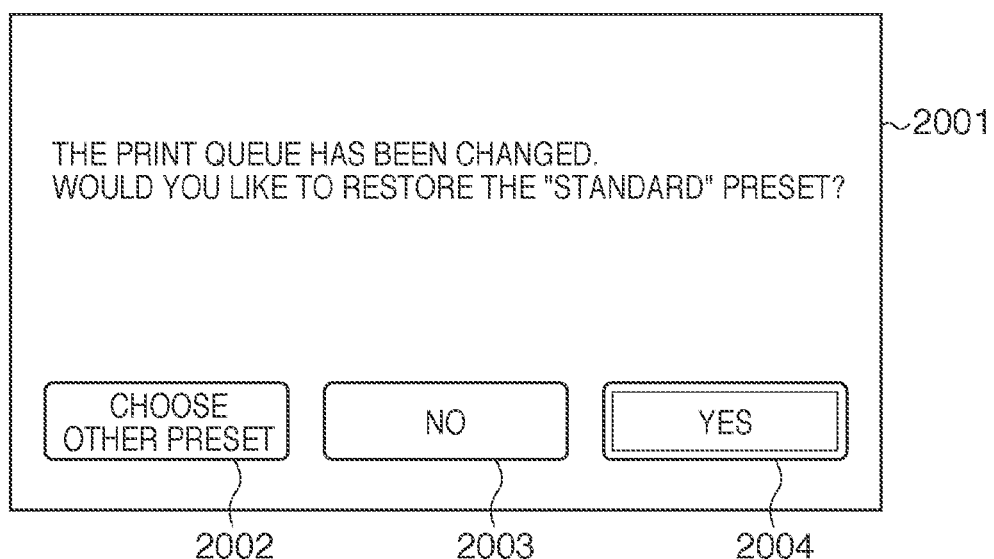
FIG. 16 shows a display example of a message when a print queue is switched.

Firstly, when the user performed an operation for changing the print queue, the printer driver after change obtains the details of the print settings obtained from the UI control module of the printer driver before change, via the OS (processing in the above-described step S1608). In step S1801, based on the printer driver after change, a message to the effect that the output destination has been changed and a message asking whether to select "Standard" or other preset are displayed. FIG. 16 shows an example of the message screen displayed at this time. In this example, a message dialog 2001 displays two messages, that is, "The print queue has been changed" and "Would you like to restore the "Standard" preset?". In step S1802, the CPU 203 determines which of "choose other preset" of a button 2002, "No" of a button 2003 and "Yes" of a button 2004 is selected as a result of being clicked by the mouse 213, input by the keyboard 212 or the like, through the message screen.

In the case where "Yes" of the button 2004 is selected, in step S1803, the print setting information of the "Standard" preset is applied and set as the print settings of "Printer D" serving as the print queue after change. Example set values of the print queue at this time are shown in FIG. 17A. "Standard" is selected here as a preset, and thus the set values shown in 2301 reflect the details of "Standard" shown in 1901 of FIG. 15.

In the case where "No" of the button 2003 is selected, via the OS, the print setting information that was obtained from the UI control module of the printer driver before change is applied as the print settings of the print queue after change, namely "Printer D" in step S1804. Specifically, details of the print settings set to the previously-selected print queue, "Printer A", are employed without change and applied. Example set values of the print queue at this time are shown in FIG. 17B. In this example, since the previously-selected preset is "Preset-2", the set values shown in 2302 reflect the details of "Preset-2" shown in 1903 of FIG. 15.

Figure 19:
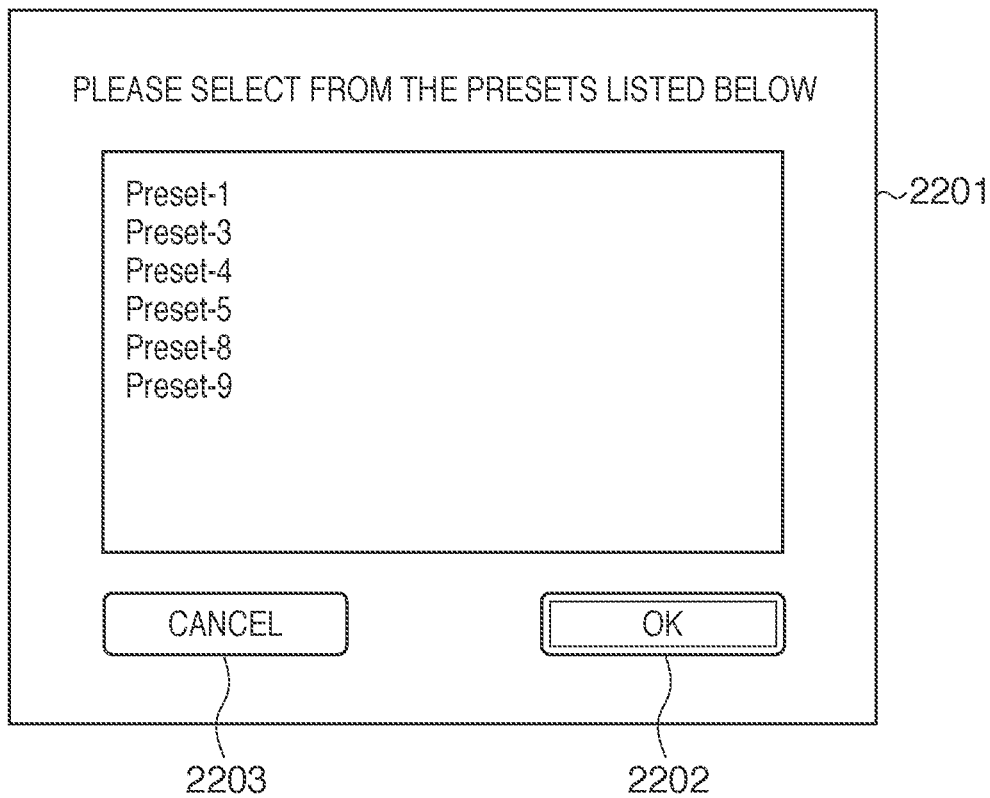
FIG. 19 is a diagram illustrating an example of a preset selection screen.

In the case where "Choose other preset" of the button 2002 is selected, in step S1805, a group of presets available for setting are retrieved from the preset information saving file registered in the OS, and the retrieved results are displayed as a list on the screen (FIG. 19). Here, "a group of presets available for setting" refers to, for example, a group of presets prepared for the vendor of the printer driver after change. FIG. 18A shows an example of the content of the preset information saving file. In step S1805, only presets that satisfy a predetermined condition are retrieved from the preset information saving file. For example, a search is performed by using a keyword indicating that the preset was registered while the print queue of ABC Company was selected (in FIG. 18A, "ABC.QueueDescription"). The preset group obtained by such a search serves as selection candidates, and is displayed in a preset selection dialog 2201 as shown in FIG. 19.

In step S1806, the user can select one preset that the user desires from the preset group, by using the keyboard 212 or the mouse 213. When a preset is selected and an OK button 2202 is clicked, the print setting information of the selected preset is delivered to the UI control module of the printer driver after change. Example set values of the print queue at this time are shown in FIG. 17C. In this example, since the selected preset is "Preset-1", the set values shown in 2303 reflect the details of "Preset-1" shown in 1902 of FIG. 15. Note that when a cancel button 2203 in FIG. 22 is selected, as in step S1804, the preset is not changed.

Other embodiments are described below.

Figure 20:
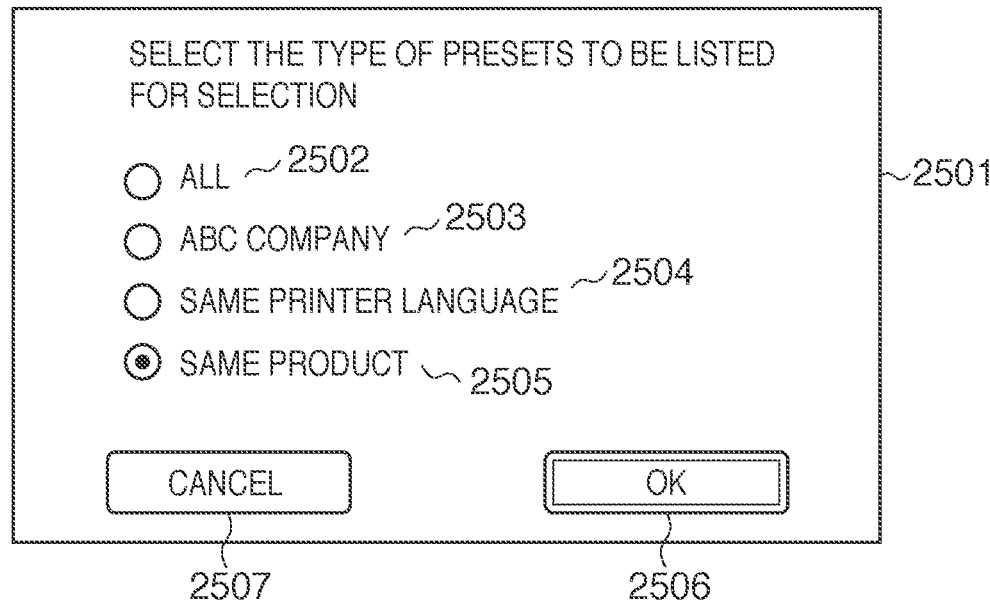
FIG. 20 shows a display example of a message when a preset is switched.
Figure 21A:
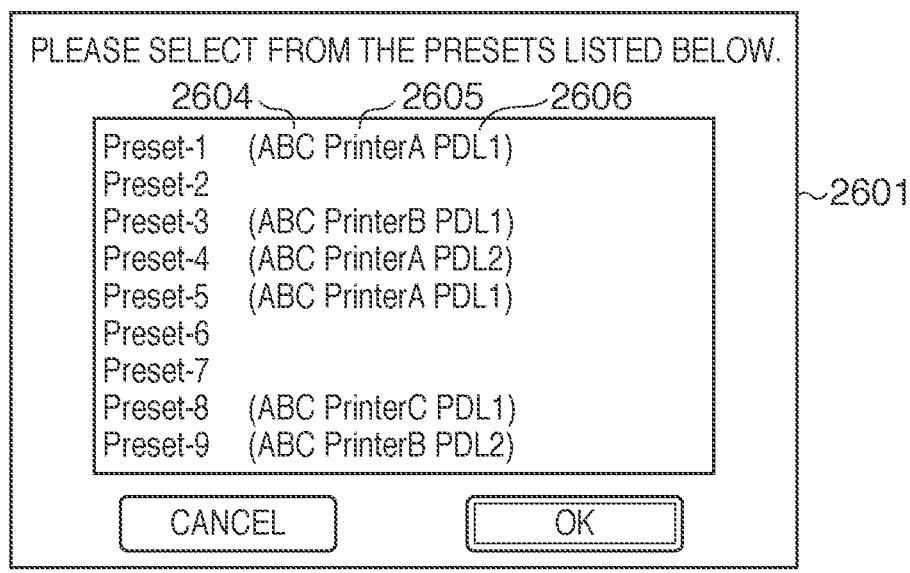

FIG. 18B shows another example of the preset information saving file, which is similar to that of FIG. 18A used in the description of the foregoing embodiment. Also, FIG. 20 shows a screen for allowing the user to select the type of the preset group to be displayed before displaying the list of presets, in the case where "Choose other preset" of the button 2002 of FIG. 16 is selected. In a dialog 2501 of FIG. 20, in the case where "all" of a button 2502 is selected, all presets registered in the OS are obtained from the preset information saving file shown in FIG. 18B. Accordingly, a preset selection screen as shown in FIG. 21A is displayed. In FIG. 21A, "ABC" of 2604 indicates the vendor name, 2605 indicates the printer name, and 2606 indicates the printer language (PDL: Page Description Language).

Figure 21B:
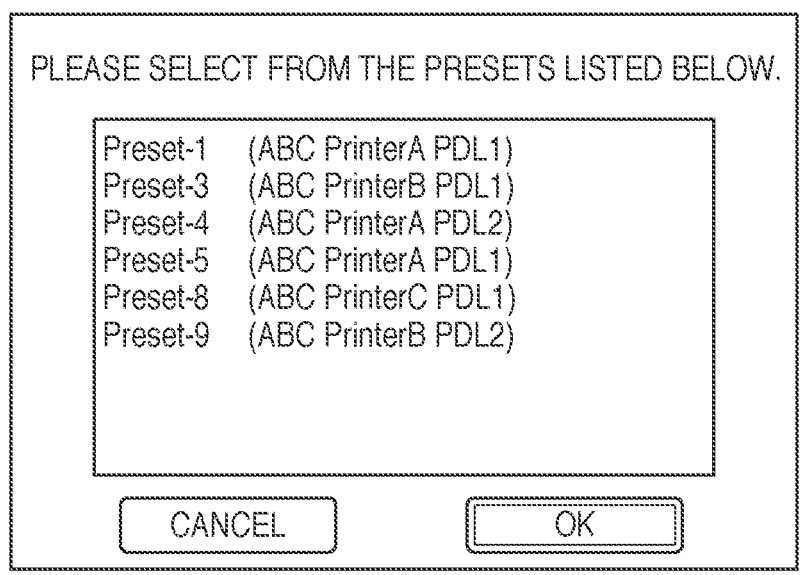

In the case where "ABC Company" of a button 2503 is selected, as in the foregoing embodiment, a search is performed by using a predetermined keyword, for example, a keyword ("ABC") indicating that registration was performed with the print queue of a specific vendor name (ABC Company). As a result of the search, a selection screen (FIG. 21B) displaying a preset group whose type corresponds to the specific vendor name (ABC Company) is displayed.

In the case where "same printer language" of a button 2504 is selected, a search is performed by using a keyword based on the printer language, (e.g., "PDL1"). As a result of the search, a selection screen (FIG. 21C) displaying a preset group whose type corresponds to a certain printer language (PDL1) is displayed. In the case where "same product" of a button 2505 is selected, a search is performed by using a keyword based on the product name (e.g., the product name following "ABC"). As a result of the search, a selection screen (FIG. 21D) displaying a preset group whose type corresponds to a specific product name (Printer A) is displayed.

In FIG. 20, although the user is allowed to select one type, it is also possible, for example, to allow the user to select a plurality of types to narrow down presets, specifically, to select presets corresponding to the same printer language and the same product.

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-096373, filed Apr. 19, 2010, which is hereby incorporated by reference herein in its entirety.

What is claimed is:

1. A method for controlling an information processing apparatus on which a plurality of printer drivers are installed, the method comprising the steps of:

under the control of an operating system having a function of sharing among the plurality of printer drivers a set value to be set in a print job that is sent to a printer, performing, following a change of a printer that serves as an output destination among a plurality of printers corresponding to the plurality of printer drivers, display control of a screen for selecting, as print setting information used for performing print setting of a print job that is sent to the post-change printer, one of (a) print setting information that is held after being set by using a printer driver corresponding to a pre-change printer, (b) default print setting information of a printer driver corresponding to the post-change printer, and (c) print setting information set in a preset that is registered by a user and managed by the operating system; and obtaining print setting information corresponding to the selection made through the displayed screen, wherein the obtained print setting information is applied to a screen for setting print settings for a print job that is sent to the post-change printer.

2. The method for controlling an information processing apparatus according to claim 1, wherein in the obtaining step, in a case where a plurality of presets are registered by the user and managed by the operating system, when use of print setting information set in a preset designated from among the plurality of presets is selected, print setting information corresponding to the selection is obtained.

3. The method for controlling an information processing apparatus according to claim 2, wherein in the display control step, in the case where a plurality of presets are registered by the user and managed by the operating system, the presets are narrowed down by using at least one of vendor information and a printer language as a condition, and use of print setting information set in a preset designated from among a plurality of presets obtained as a result of the narrowing down is selected.

4. The method for controlling an information processing apparatus according to claim 1, wherein in the obtaining step, with respect to the print setting information that is held after being set by using the printer driver corresponding to the pre-change printer, the print setting information that was obtained by the operation system from the printer driver corresponding to the pre-change printer is obtained via the operating system.

5. A non-transitory computer-readable storage medium on which is stored a program for causing a computer to execute a method for controlling an information processing apparatus on which a plurality of printer drivers are installed, the method comprising the steps of:

under the control of an operating system having a function of sharing among the plurality of printer drivers a set value to be set in a print job that is sent to a printer, performing, following a change of a printer that serves as an output destination among a plurality of printers corresponding to the plurality of printer drivers, display control of a screen for selecting, as print setting information used for performing print setting of a print job that is sent to the post-change printer, one of (a) print setting information that is held after being set by using a printer driver corresponding to a pre-change printer, (b) default print setting information of a printer driver corresponding to the post-change printer, and (c) print setting information set in a preset that is registered by a user and managed by the operating system; and obtaining print setting information corresponding to the selection made through the displayed screen, wherein the obtained print setting information is applied to a screen for setting print settings for a print job that is sent to the post-change printer.

6. An information processing apparatus on which a plurality of printer drivers are installed, the information processing apparatus comprising:

a control unit that, under the control of an operating system having a function of sharing among the plurality of printer drivers a set value to be set in a print job that is sent to a printer, performs, following a change of a printer that serves as an output destination among a plurality of printers corresponding to the plurality of printer drivers, display control of a screen for selecting, as print setting information used for performing print setting of a print job that is sent to the post-change printer, one of (a) print setting information that is held after being set by using a printer driver corresponding to a pre-change printer, (b) default print setting information of a printer driver corresponding to the post-change printer, and (c) print setting information set in a preset that is registered by a user and managed by the operating system; and an obtaining unit that, under the control of an operating system having a function of sharing among the plurality of printer drivers a set value to be set in a print job that is sent to a printer, obtains print setting information corresponding to the selection made through the displayed screen, wherein the obtained print setting information is applied to a screen for setting print settings for a print job that is sent to the post-change printer.

7. An information processing apparatus on which a plurality of printer drivers are installed, the information processing apparatus comprising:

a control unit that, under the control of an operating system having a function of sharing among the plurality of printer drivers a set value to be set in a print job that is sent to a printer, performs, following a change of a printer that serves as an output destination among a plurality of printers corresponding to the plurality of printer drivers, display control of a screen for selecting, as print setting information used for performing print setting of a print job that is sent to the post-change printer, one of (a) print setting information that is held after being set by using a printer driver corresponding to a pre-change printer, and (b) print setting information set in a preset that is registered by a user and managed by the operating system; and an obtaining unit that, under the control of an operating system having a function of sharing among the plurality of printer drivers a set value to be set in a print job that is sent to a printer, obtains print setting information corresponding to the selection made through the displayed screen, wherein the obtained print setting information is applied to a screen for setting print settings for a print job that is sent to the post-change printer.

* * * * *